US006957798B1

(12) United States Patent  (10) Patent No.: US 6,957,798 B1
Schmidt  (45) Date of Patent: Oct. 25, 2005

(54) PINCH VALVE

(76) Inventor: Edward A. Schmidt, 168 Pine St., Medfield, MA (US) 02052

( * ) Notice: Subject to any disclaimer, the term of this patent is extended or adjusted under 35 U.S.C. 154(b) by 0 days.

(21) Appl. No.: 10/760,956

(22) Filed: Jan. 20, 2004

(51) Int. Cl.[7] ............................................... F16K 7/06
(52) U.S. Cl. ....................................................... 251/6
(58) Field of Search ................................... 251/4, 6, 9

(56) References Cited

U.S. PATENT DOCUMENTS

| 4,569,502 A | 2/1986 | Elliott |
| 4,682,755 A | 7/1987 | Bernstein et al. |
| 4,911,399 A * | 3/1990 | Green ............................ 251/6 |
| 5,113,906 A | 5/1992 | Hogner |

* cited by examiner

*Primary Examiner*—Justine R. Yu
*Assistant Examiner*—Peter deVore
(74) *Attorney, Agent, or Firm*—Cesari and McKenna, LLP; William A. Loginov

(57) ABSTRACT

This invention provides a pinch valve having a pinch region defined by a pair of rotating pinch elements. These pinch elements define a variable profile that substantially surrounds the entire circumference of a tube in the pinch region and that thereby ensures that the tube is always returned to the desired opening size at all valve adjustment settings in a range from fully open to fully closed. More particularly, the pinch elements are provided with a pinch region that defines a surface geometry that includes a continuously variable-length (ramping) linear segment, disposed at a continuously variable depth (ramping from full open to fully pinched), that pinches the walls into a pair of opposed parallel lines throughout the majority of their rotational movement/adjustment range. The pinch elements also include upper and lower variably sized fillets (typically curved) on each side of the linear segment that capture the curved top and bottom of the tube, adjoining the pinched walls, so as to force the top and bottom back into a desired shape despite the presence of any permanent deformation of the walls. Overall, the pinching region is adapted to conform to the prevailing outline of the tube at the pinch point throughout the range of pinch settings. In an illustrative embodiment, the pinch elements counter-rotate, so that parallelism between opposing pinched walls is enhanced.

9 Claims, 9 Drawing Sheets

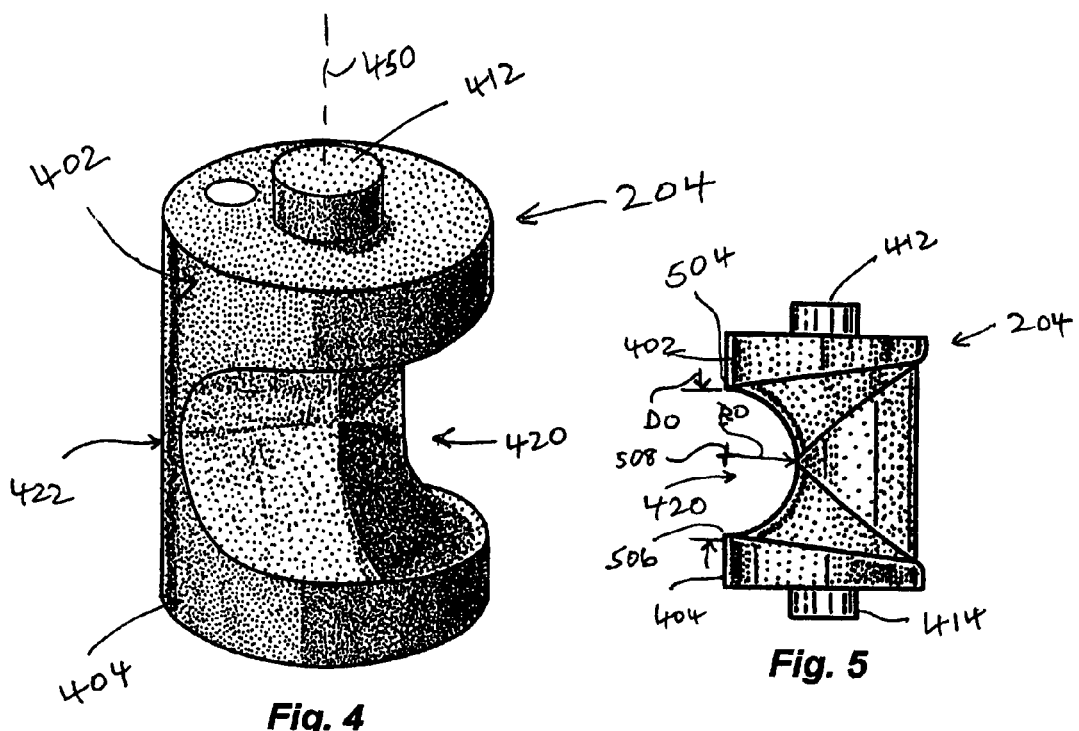
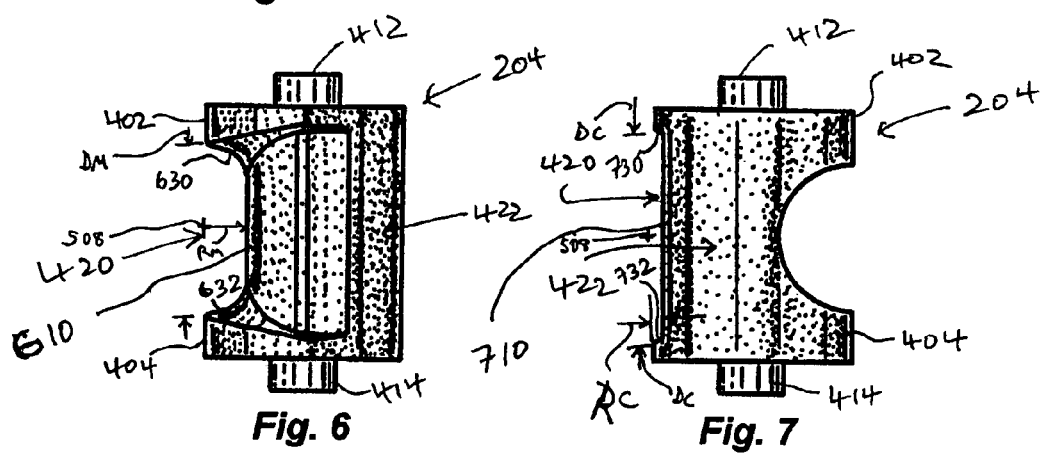

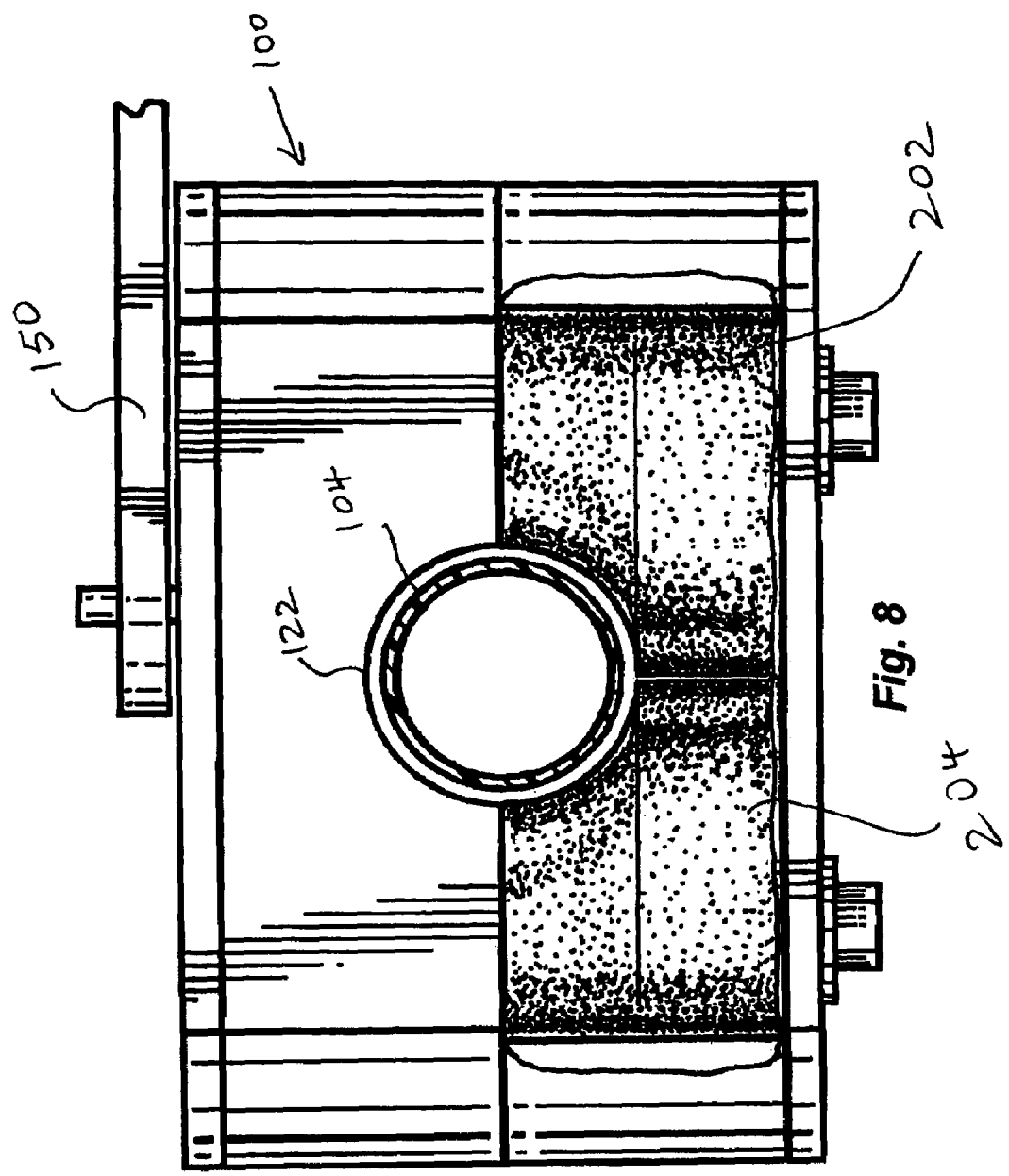

PINCH VALVE

BACKGROUND OF THE INVENTION

1. Field of the Invention

This invention is related to valves and more particular to pinch-type valves.

2. Background Information

Pinch valves are used desirably for controlling flow of fluids in a variety of processes and environments. In general, a pinch valve is a mechanism that provides a variable-diameter pinching force to a flexible or elastomeric tube/hose. By pinching, or constricting the tube, the amount of flow therethrough is reduced from full, unrestricted flow, or completely shut off. One advantage of pinch valves is that the actuating mechanism is located outside of the tube interior lumen. The fluid never confronts any gates, flaps or other jointed/seamed parts. Rather, the fluid only confronts the pinched (but otherwise unbroken) inner wall of the tube. This greatly reduces the chances of undesirable accretion of particulates in multiphase or colloidal mixtures. In a conventional, gated valve with cracks, seams or discontinuities, such accretions are much more likely to occur.

In medical applications small-scale pinch valves are used frequently for regulating the flow of gasses and vital fluid, especially those containing particulates, such as whole blood. In general, larger-diameter flow conduits used in chemical processing may also use pinch valves where particulate accretion may be a concern.

A prior art pinch valve is described in U.S. Pat. No. 4,682,755 entitled MECHANICAL CONTROL SYSTEM IN FLOW DEVICES, by Bernstein, et al. This patent teaches a pinch valve structure in which a pair of same-direction-rotating eccentric pinch members move toward and away from each other to regulate the size of a tube opening placed between them.

One disadvantage to a pinch valve of this and other types is that they tend to plastically deform and flatten the tube over time. Hence, when the pinch valve is moved from a highly constricted, to a more, fully open position, the tube may remain deformed in a more-constricted state. Where the internal pressure of the fluid is low, the flow may be undesirably restricted, due to the permanent deformation of the tube.

SUMMARY OF THE INVENTION

This invention overcomes the disadvantages of the prior art by providing a pinch valve having a pinch region defined by a pair of rotating pinch elements. These pinch elements define a variable profile that substantially surrounds the entire circumference of a tube in the pinch region and that thereby ensures that the tube is always returned to the desired opening size at all valve adjustment settings in a range from fully open to fully closed. More particularly, the pinch elements are provided with a pinch region that defines a surface geometry that includes a continuously variable-length (ramping) linear segment, disposed at a continuously variable depth (ramping from full open to fully pinched), that pinches the walls into a pair of opposed parallel lines throughout the majority of their rotational movement/adjustment range. The pinch elements also include upper and lower variably sized fillets (typically defined by curved or part-circle shapes) on each side of the linear segment that capture the curved top and bottom of the tube, adjoining the pinched walls, so as to force the top and bottom back into a desired shape despite the presence of any permanent deformation of the walls. Overall, the pinch region is adapted to conform to the prevailing outline of the tube at the pinch point throughout the range of pinch settings.

In an illustrative embodiment, the pinch elements counter-rotate, so that parallelism between opposing pinched walls is enhanced.

BRIEF DESCRIPTION OF THE DRAWINGS

The invention description below refers to the accompanying drawings, of which:

FIG. 4 is a perspective view of a pinch element for use in the pinch valve of FIG. 1;

FIG. 5 is a side view of the pinch element of FIG. 4 in a fully opened rotational orientation;

FIG. 6 is a side view of the pinch element of FIG. 4 at a partially closed rotational orientation;

FIG. 7 is a side view of the pinch valve at FIG. 4 at a fully closed rotational orientation;

FIG. 8 is a partially exposed front view of the pinch valve of FIG. 1 showing the pinch elements in a fully opened orientation;

DETAILED DESCRIPTION OF AN ILLUSTRATIVE EMBODIMENT

Figure 1:
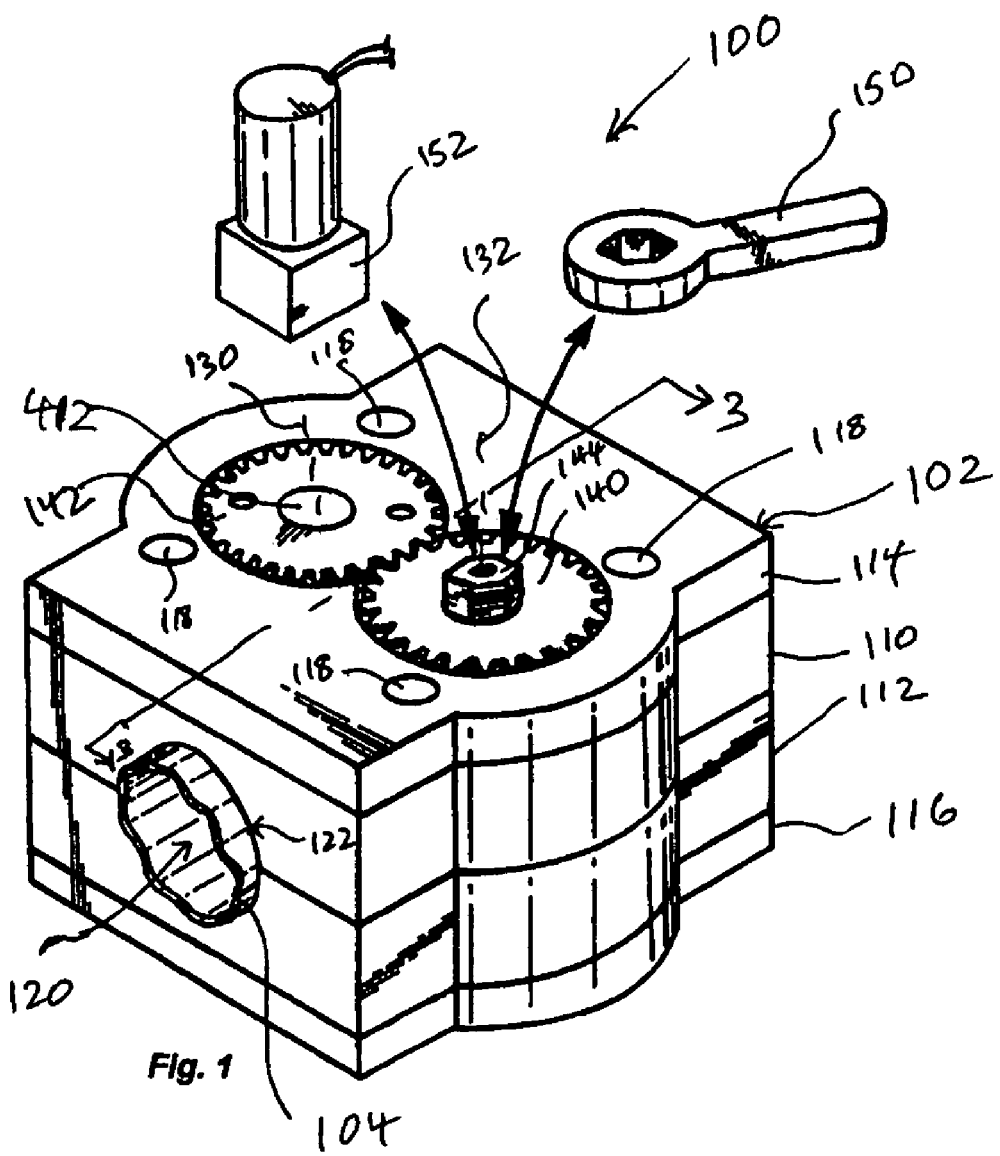
FIG. 1 is a perspective view of a pinch valve according to an illustrative embodiment of this invention.

FIG. 1 shows an external view of a pinch valve 100 according to an illustrative embodiment of this invention. The valve includes a multi-section housing 102. The housing can be constructed from a variety of materials and with a variety of sectioning arrangements. As will be described below, because the fluid is contained entirely within the captured tube 104, the external structure of the valve need not be sealed or even fully enclosed. In this example, a pair of main, central housing halves 110 and 112 are provided, along with upper and lower cap sections 114 and 116. The housing is joined together by four parallel bolts 118 with heads extending through the bottom (see FIG. 3) and threaded ends engaging internal threads formed in the upper cap 114. Nuts and/or other securing members can be provided in alternate embodiments.

The size of the housing 102 is typically proportionate to the size of the tube 104 passing therethrough. It must be sufficient to house a pair of pinch elements that act upon the tube as described below. The tube 104 can be constructed from any of a number of flexible or elastomeric materials. Natural rubber, silicone, polyurethane, polyvinylchloride or any other acceptable material can be used. In general, this material should have high durability under repeated deformation and should be capable of flexing sufficiently to form a pinch seal between the walls of its internal lumen 120.

Figure 14:
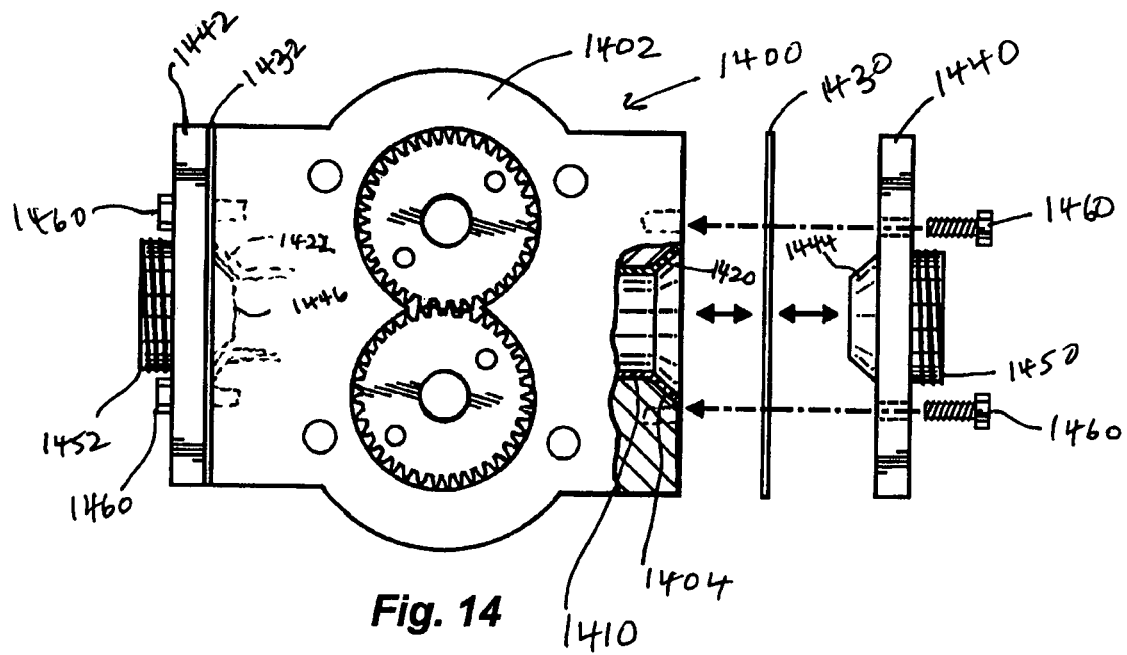
FIG. 14 is a partially exposed top view of a pinch valve according to an alternate embodiment having end connectors and an integral tube element.

The tube 104, in this embodiment, passes through an exit orifice 122 on each side of the housing 102. In this embodiment, the valve is a slip-over type that regulates flow in an otherwise continuous tube extending between two external connections (not shown). The description herein expressly contemplates that an integral, captured tube member with end connectors, such as that shown in the alternate embodiment of FIG. 14, can be provided. Hence, the following description herein should be taken to include both types of tube. The pinch elements, described below, rotate on axes 130 and 132 that extend through the casing orthongonally to the axis of extension of the tube. The pinch elements move together, being rotationally interconnected by a pair of same-size/same-tooth-count gears 140 and 142 recessed into the top cap 114 of the housing. The exact placement and orientation of the gears is highly variable. In general, each pinch element has a single gear meshing with the opposing pinch element's gear. In this manner, the two pinch elements counter-rotate when rotational force is applied to one of the gears. In this embodiment, the gear 140 includes a drive member 144 that can be a keyed shaft, hex head or other engagement feature. The engagement feature receives a handle 150 or electro-mechanical/pneumatic rotational actuator 152. Either a manual or powered drive can be used to control the rotational position of the pinch elements.

Figure 2:
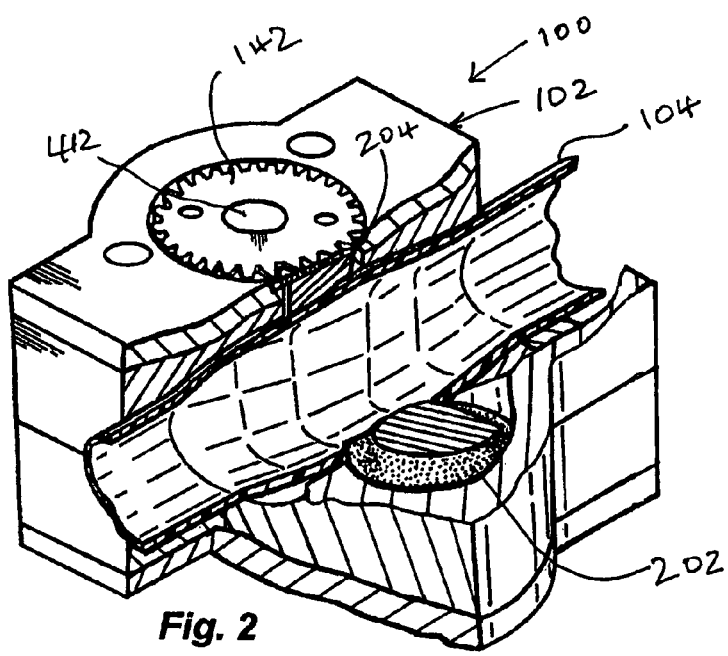
FIG. 2 is a partial cutaway perspective view of the pinch valve of FIG. 1.
Figure 3:
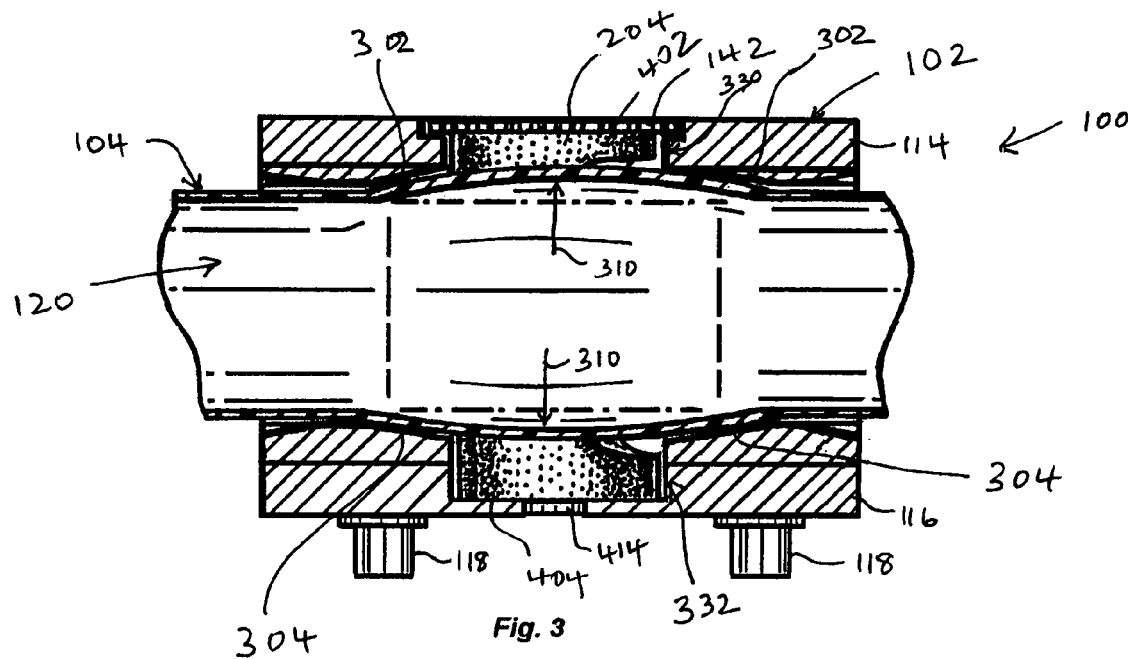
FIG. 3 is a side cross section taken along line 3—3 of FIG. 1.

With further reference to FIGS. 2 and 3, the valve 100 is shown in exposed view. The pinch elements 202 and 204 are shown in cutaway in FIG. 2. Like conventional pinch valves, they surround the tube's outer wall and allow it to be deformed between the nip (pinch point) formed by the pinch elements. The pinch elements together define a pinch zone that ranges between a circular profile (fully opened) and a flattened, parallel line profile (fully closed) where the tube's inner wall is pinched together in firm engagement.

As shown in FIG. 3, the housing includes ramped entry sections 302 and 304 on each side to accommodate the pinching deformation of the tube as shown. In other words, as the tube is pinched into a closed position, the walls deform upwardly/downwardly (arrows 310) as the wall material of the tube seeks to conform to the opening between the pinch elements as the sides of the tube are flattened.

With reference to FIGS. 4–7, the geometry of an exemplary pinch element according to an illustrative embodiment of this invention is shown in greater detail. For the purposes of this description, the pinch element 204 is depicted. However, this description applies identically to the opposing pinch element 202, which is an exact mirror image of the pinch element 204. In general, when the pinch elements counter-rotate, they present equal and opposite confronting profiles to the tube at the pinch point. These pinch profiles ranging continuously (e.g. a ramp) between a circular, fully opened geometry and a highly flattened, fully closed geometry.

As shown in FIG. 4, the pinch element 204 includes a top section 402 and a bottom section 404 that are circular/cylindrical. With further reference to FIGS. 5–7, the top section includes an integral, centered axle 412 and the bottom section 404 contains a similar axle 414. In this embodiment, the axle 412 is used to seat the gear 142. The bottom axle 414 is seated within a recess in the bottom cap 116, aiding in the centering and lateral restraint of the bottom section 404 of the pinch element. The top section 402 and bottom section 404 include, at their topmost and bottommost edges, a continuous circular perimeter. This continuous circular perimeter allows these sections to act as bearings as the pinch element is rotated within the housing. The housing includes cylindrical wells 330 and 332 (see FIG. 3) that are sized in diameter to conform to the diameter of the pinch elements' top and bottom portions so that lateral movement of each pinch element within the housing is relatively restrained.

The cylindrical top and bottom sections 402, 404 of the pinch element bound the novel tube pinch region 420 according to this embodiment. The pinch region extends approximately 180° around the circumference of the pinch element. The backside 422 of the pinch element is mostly comprised of a straight cylindrical section that is a continuation (partial-cylinder) of the top and bottom sections 402 and 404.

The pinch region 420 is configured so that its profile (the shape through a given plane extending through the rotation axis 450, or a cross section through the axis) varies between a semi-circular section, as shown in FIG. 5, to a partially closed section as shown in FIG. 6, to a fully closed, highly narrowed (pinched) section as shown in FIG. 7. In the fully opened orientation, the region is a semi-circle, having a radius RO (the term "radius" being characterized broadly as the maximum depth of the pinch region relative to the outside edge of the top and bottom sections 402, 404 as well as the axis of extension of the captured tube), which is one-half the diameter DO (the term "diameter" is used broadly to define the vertical distance between the outer corners 504 and 506 of the pinch region 420). Moving around the circumference of the pinch element 204 (FIG. 6), the radius RM is characterized by a flattened pinching segment 610 that begins on the circumference shortly after the full-diameter (fully open) section shown in FIG. 5. The "diameter" DM is greater than twice the radius RM to account for movement of the tube material upwardly (see arrows 310 and FIG. 3) as the tube is pinched. Note that the flat segment is bounded by opposing end arcs 630 and 632. These arcs are reduced in radius as the segment grows in length and the segment depth (radius) decreases (causing greater pinch). They provide a run-out for the top and bottom of the pinched tube as described further below).

Moving further around the pinch element circumference (FIG. 7) to the fully closed orientation, the pinch region 420 has a profile with a relatively shallow depth/radius RC that is significantly less than the diameter DC of the flat segment 710. In this orientation, the end arcs 730, 732 have a very small effective radius as will be discussed further below.

As noted above, throughout most of the circumference (following the fully open, round profile), the pinch region 420 profile is characterized by an elongated flat segment 710. The length of the "diameter" varies in an approximately linear relationship (as a function of $\pi r$ (pinch element circumference) between the fully open and fully closed orientations. The "radius" likewise varies linearly between the fully open and fully closed orientations. The terminal fully open and fully closed diameters (lengths) and radii (depths) are chosen based upon a number of factors. Most significantly, the fully open depth or radius and length or diameter are each chosen based upon the unpinched outer diameter of the tube. In other words, the profile of the pinch zone in the fully open state should closely conform to the outer diameter of the tube. Likewise, the final, fully closed depth/radius and length/diameter are chosen based upon the final thickness of the pinch tube and its final pinched expansion upwardly and downwardly (in direction of arrows 310) when pinched to a fully closed position. This measurement can be, in large part, based on a combination of the outer diameter of the unpinched tube and the wall thickness of the tube. In general, the thicker the tube, the greater the radius/depth RC when fully pinched. Similarly, the final length/diameter DC is determined primarily by the unpinched outer diameter of the tube as a greater unpinched outer diameter will generate a greater final flattened/pinched length. In practice, to determine these measurements, it is often most helpful to use an actual sample of the tube to be used in the valve, and accurately measure its unpinched outer diameter and fully pinched length/diameter and depth/radius.

The operation of the valve, through various stages of adjustment, is now described with reference to FIGS. 8–12. A handle 150 of the type described in FIG. 1 is used in this embodiment to actuate the pinch members 202 and 204.

In FIG. 8, the pinch members are shown in a fully open position with the tube exhibiting a circular cross section profile, as shown. Note that the pinch members, while shown with a small gap relative to the outer wall of the tube may be relatively close-fitting in actual practice. The illustrated gap is shown mainly to differentiate elements for this clarity.

Figure 9:
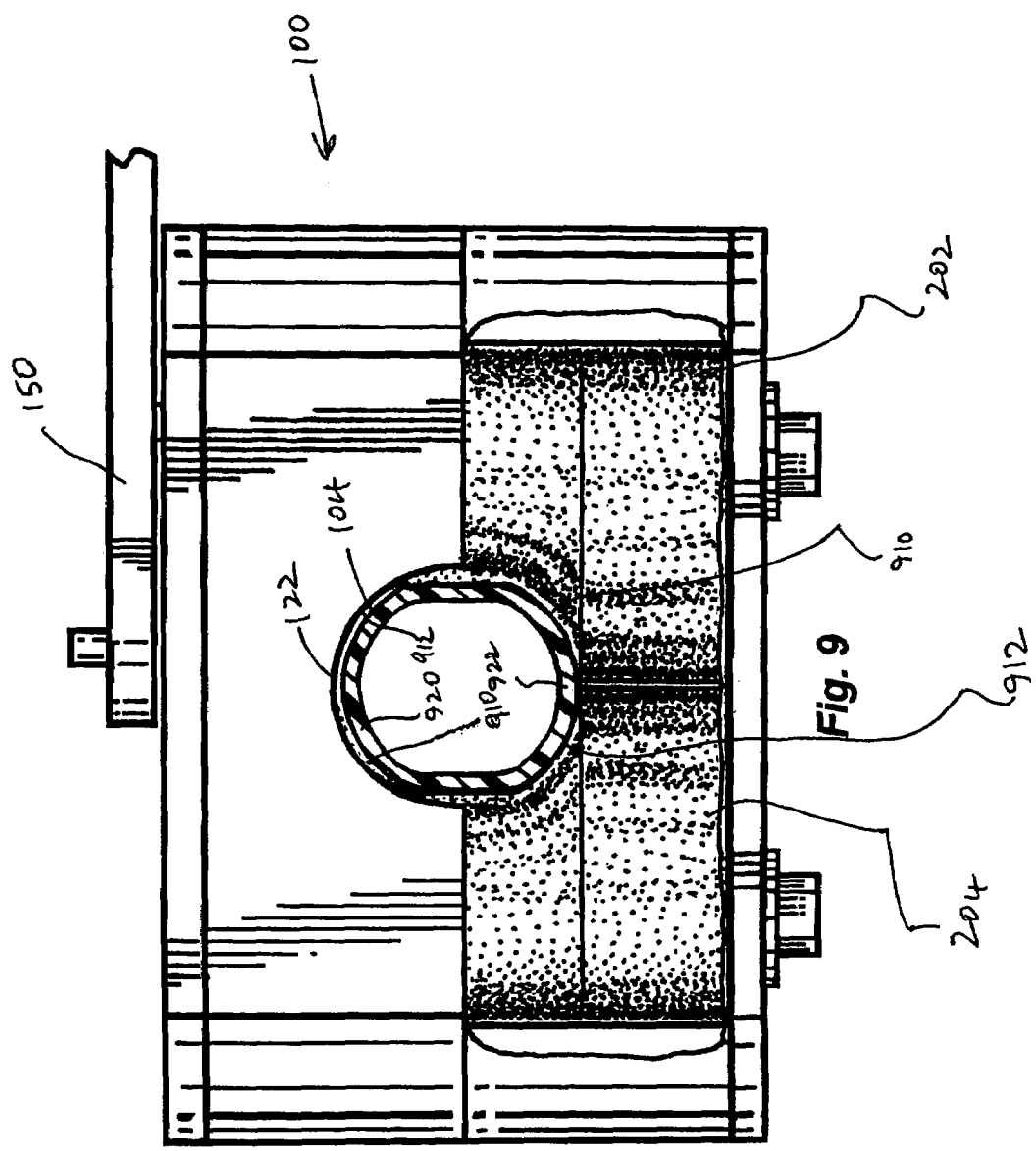
FIG. 9 is a partially exposed front view of the pinch valve of FIG. 1 showing the pinch elements rotated approximately 45° from fully open.

In FIG. 9, the handle 150 has been moved approximately 45° from the position shown in FIG. 8. The flattened walls of the pinch segment of each pinch member 202 and 204 are now bearing upon the outer walls of the tube 104. The arcuate upper and lower ends (or "fillets") 910 and 912 of the pinch regions capture the top and bottom ends 920 and 922 of the tube and form them into the illustrated rounded-over shape. In this manner, the tube remains at all time pressurably engaged around substantially its entire circumference. As will be described further, the substantially full-engagement of the tube by the pinch region about its entire circumference ensures that, as pinch pressure is released and the tube is again opened, it does not remain deformed in a pinched position. Rather, the filleted ends 910 and 912 bear upon the top and bottom walls 920, 922 of the tube and force it back into the appropriate open position. In this embodiment, the fillets are defined approximately by quarter circles. However, non-circular shapes can also be employed. In general, it is contemplated that the fillets capture the tube as it is pinched and conform to its deformation in the pinching process so as to maintain a substantially (or at least approximately) full engagement of the tube circumference throughout a range of pinch adjustments (e.g. through a range of pinch element rotational positions/resulting pinch profiles).

Figure 10:
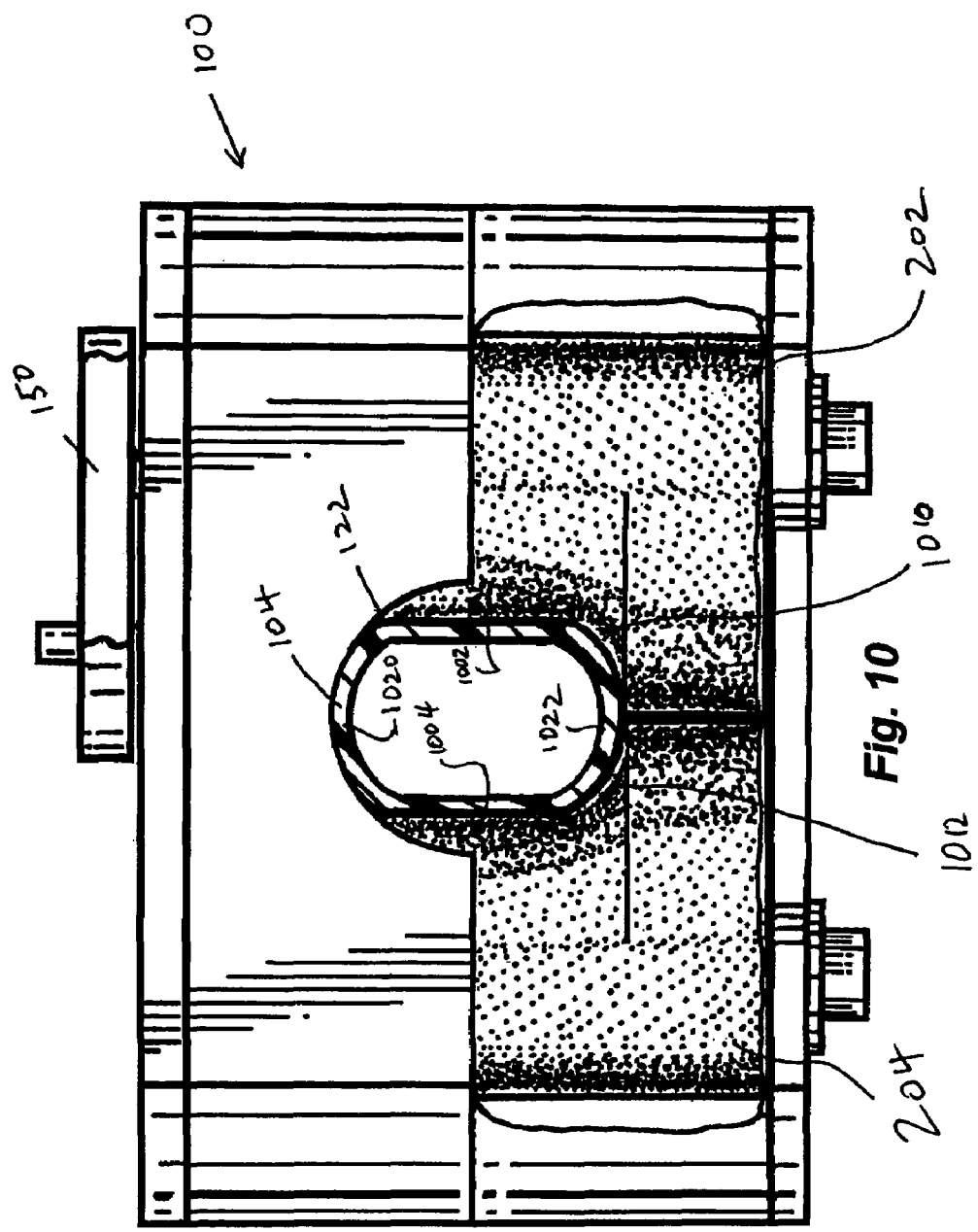
FIG. 10 is a partially exposed front view of the pinch valve of FIG. 1 showing the pinch elements rotated approximately 90° from fully open.

As shown in FIG. 10, the handle is moved approximately 90° from the original fully open position of FIG. 8. At this point, the flattened pinch segments 1002 and 1004 of the respective pinch elements 202 and 204 further reduce the width of the tube. Simultaneously, the respective top and bottom ends of the tube 1020 and 1022 are expanded vertically within the bounds of the pinch element's filleted ends 1010 and 1012.

Figure 11:
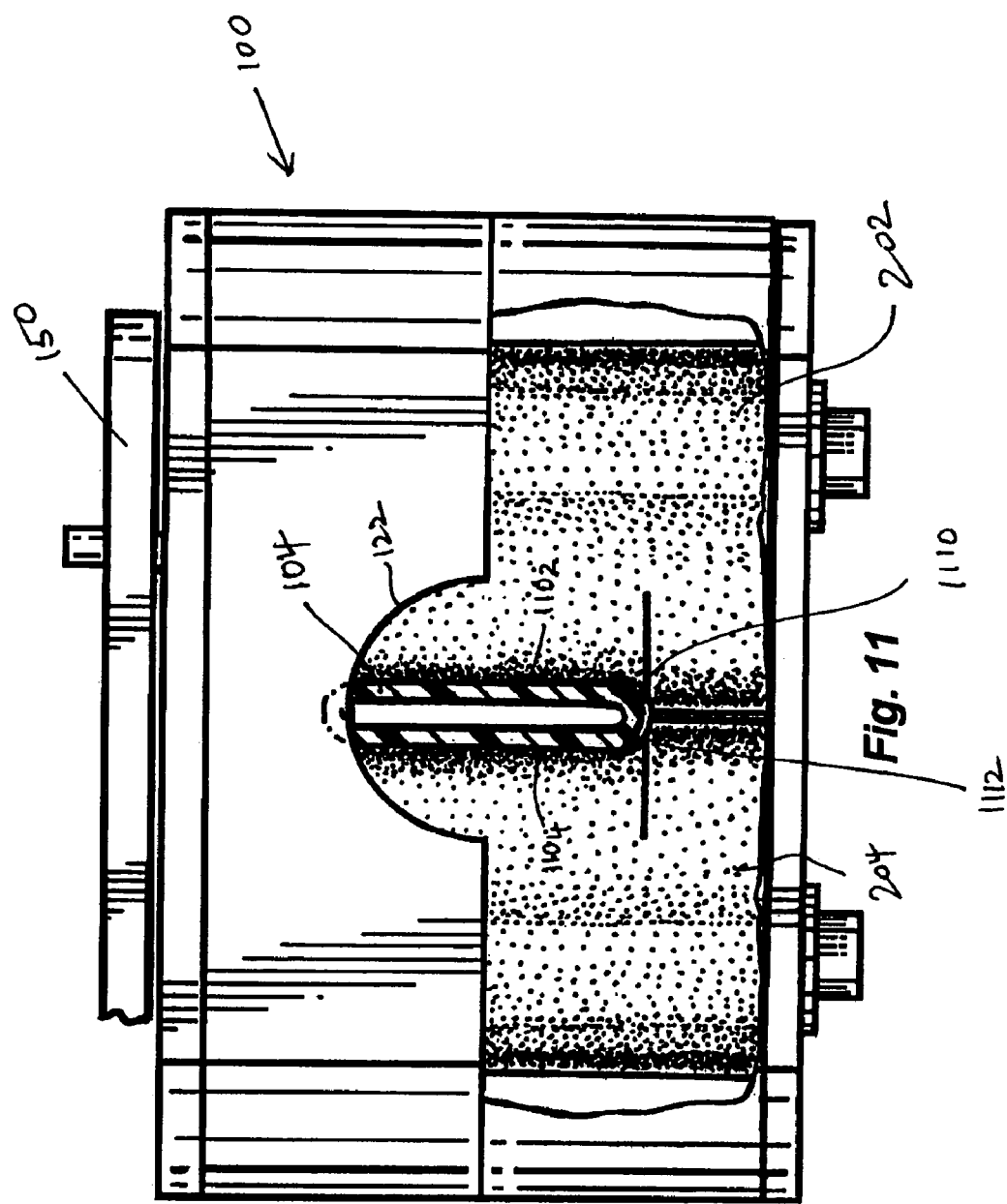
FIG. 11 is a partially exposed front view of the pinch valve of FIG. 1 showing the pinch elements rotated approximately 135° from fully open.

In FIG. 11, the handle 150 has been moved to 135° from the original fully open position of FIG. 8. The flattened segments 1102 and 1104 of the respective pinch elements 202 and 204 are now significantly elongated and the filleted ends 1110 and 1112 of the pinch regions are defined a relatively small inherent radius. The tube 104 is significantly narrowed, and is almost fully closed.

Figure 12:
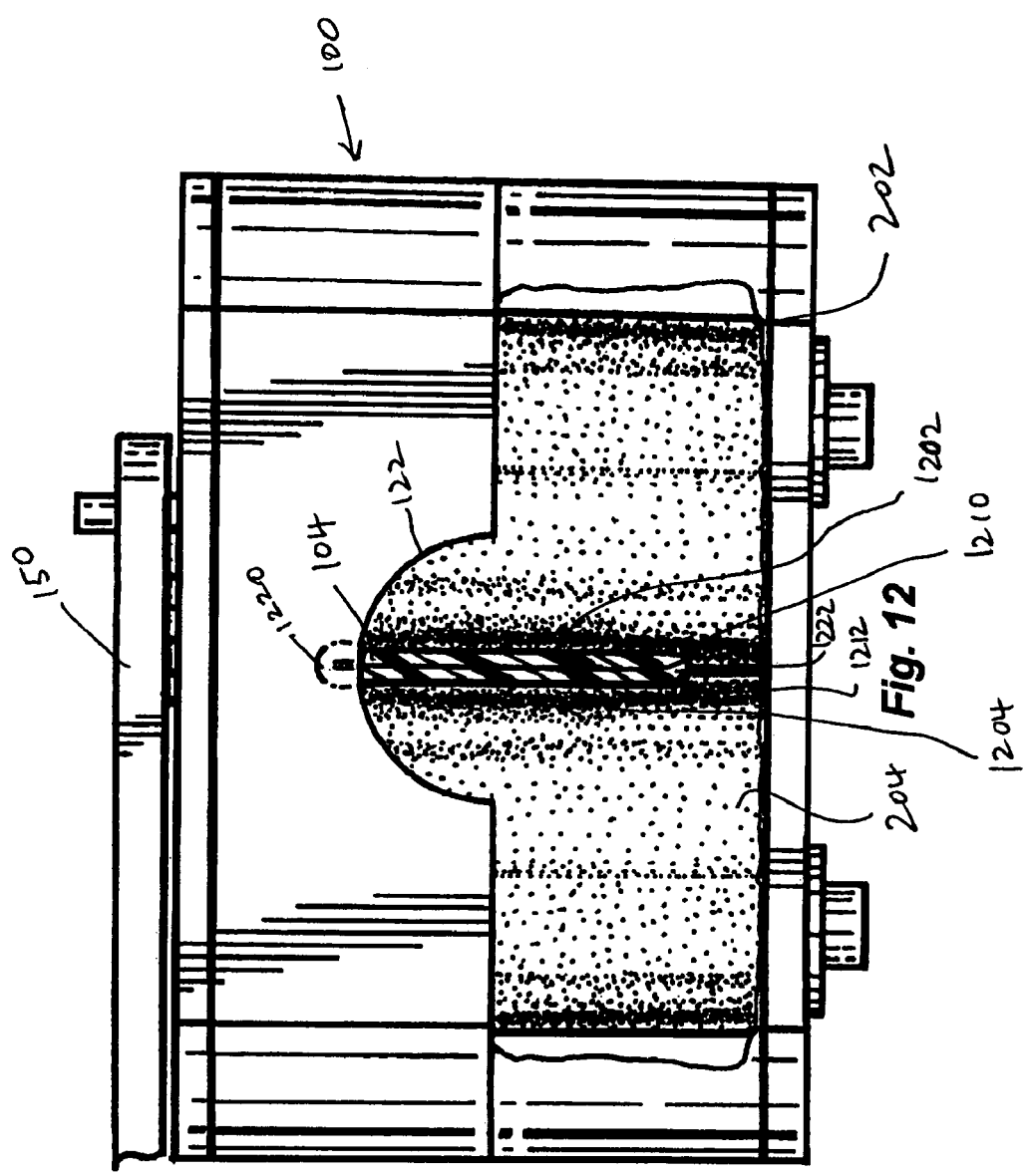
FIG. 12 is a partially exposed front view of the pinch valve of FIG. 1 showing the pinch elements rotated approximately 180° to a fully closed position.

Finally, in FIG. 12, the handle 150 has been moved to almost 180° from its initial fully open position in FIG. 8. The actual fully-closed position may typically be less than maximum pinch depth and maximum handle rotation (maximum rotation being 180 degrees in this example) to ensure a tight pinch seal in the event of worn, tubes and wall-thickness variability. The flattened segments 1202 and 1204 of the respective pinch elements 202 and 204 are at their maximum length/diameter and the fillets 1210 and 1212 are at a minimum depth/radius. In this orientation, the tube 104 is pinched fully closed with no gap between the tube's inner walls and the top and bottom tube ends 1220 and 1222 represent a minimum radius (essentially a crease) that is captured by the fillets 1210 and 1212 of the pinch elements' pinch regions. As noted above, in this orientation, a tube may likely succumb to plastic deformation after continued cyclic loading, and may not return to a fully open position due to the crease that is formed by the pinching action along the top and bottom 1220 and 1222 ends of the tube 104. As the pinch elements are opened (in a sequence opposite that described running from FIG. 12 to FIG. 8) the ever-narrowing distance between arcuate ends (fillets) of the pinch region, and shortening of the flattened segment of the region bias the top and bottom ends of the tube back into the desired fully open and rounded shape, as shown in FIG. 8. It is assumed that the material from which the tube wall is constructed has sufficient internal strength so that it does not collapse or buckle inwardly during the opening process. Hence, the tube is assured to always return to the desired shape through all degrees of adjustment.

Figure 13:
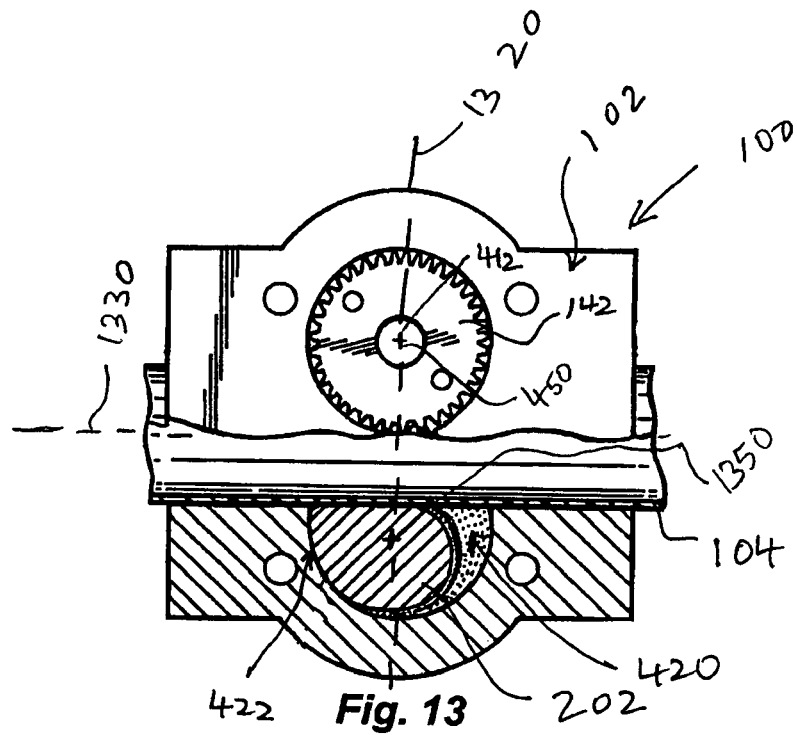
FIG. 13 is a partially exposed top view of the pinch valve of FIG. 1 in a fully open position.

With brief reference to FIG. 13, which shows a partial cross section through the housing 102 and pinch element 202, the spiraling shape of the pinch region 420 can be seen more clearly. In this view, the pinch region is adjusted into the fully open position. The backside 422 of the pinch region is also shown. Note again that the pinch points (the pinching nip) for each of the pinch elements with respect to the tube are located roughly along a plane 1320 that is orthogonal to the extension axis 1330 of the tube 104 and is taken through each axis of rotation 450, 1350 of the pinch elements. This orientation is beneficial in preventing binding of the pinch elements on the surface of the tube and otherwise ensures a positive pinching action with a symmetrical pinch-closure in the tube.

As noted above, FIG. 14 shows a version of the valve 1400 according to an alternate embodiment. In this embodiment, the housing 1402 includes, on its ends, a pair of frusticonical, flared openings 1404. Otherwise, the internal mechanism of the valve, including pinch elements, is unchanged from that described above. The tube 1410 includes opposing flared ends 1420 and 1422 that fit snugly against the frusticonical housing ends 1404. Thus, the tube 1410 in this embodiment is built into the housing and does not move appreciably along its axial direction during pinching. By including a pre-assembled tube, adjustment of the valve is more-predictable (since the tube size and performance is known) and the valve can be easily applied to a variety of preexisting fluid conduit arrangements via appropriate end connectors. A seal 1430 and 1432 is applied to each end of the housing. The seal includes a central orifice (not shown) that allows fluid to pass through the seal in the region of the tube ends. Each seal 1430, 1432 is sandwiched by a cap end 1440 and 1442, respectively. Each cap end includes a frusticonical formation 1444 and 1446, respectively. These formations 1444, 1446 capture and secure the ends 1420 and 1422 of the tube. The combination of the seal 1430, 1432 and caps 1440, 1442 effectively seal the valve tube with respect to the cap ends. Each cap end 1440, 1442 includes an appropriate pipefitting or other end connection 1450 and 1452, respectively, for interconnecting the valve to a fluid system. The end connector can be, for example, any acceptable connector including an internal or external threaded connector, a flange or a clamp-on base. In this example, four bolts 1460 are used to secure each cap 1440 and 1442 to its respective side of the housing 1402. Note, it is expressly contemplated that the manner in which the tube is fixedly attached or applied to the interior of the housing is highly variable. Various end caps, seals and other attachments or geometries for the tube and/or housing can be employed to fix the tube in the housing and seal it with respect to the interconnected fluid conduits of the system.

The foregoing has been a detailed description of illustrative embodiments of this invention. Various modifications and additions can be made without departing from the spirit and scope thereof. For example, the housing shown herein is only one possibly configuration for retaining the pinch elements. The pinch elements may include a variety of bearing structures and additional gear and axle arrangements used to effect the movement described generally herein. In addition, while the tube is shown as a single diameter, continuous tube, it is contemplated that the tube may include enlarged or narrow diameter sections at certain locations. The tube may also include additional securing members along its exterior to hold it with respect to the valve housing. Any of the components herein can be constructed from a variety of metallic, plastic or composite materials. In addition, it is expressly contemplated that the valve may include various locking features to retain the pinch elements at a desired setting once adjusted. Further, while a circular-cross-section tube (in the fully open position) is described it is expressly contemplated that the tube can have a non-circular cross section in its unpinched state, with pinch regions formed to conform to the tube's particular non-circular unpinched outer perimeter. Moreover, while the pinch region is preferably a continuously ramping profile, it is expressly contemplated that the pinch region, about each pinch element's circumference can be defined a set of stepped, discrete profiles ranging form the fully open profile to the fully closed profile. Finally, while the pinch elements are shown as adjustable through approximately 180 degrees, it is expressly contemplated that the adjustment arc may be greater or less than 180 degrees. Accordingly, this description is meant to be taken only by way of example and not to otherwise limit the scope of the invention.

What is claimed is:

1. A pinch valve comprising:
   a housing that encloses a flexible tube;
   a first pinch element and a second pinch element, each being oriented on a respective axis of rotation transverse to an axis of extension of the tube, each of the first pinch element and the second pinch element being constructed and arranged to rotate with respect to each other between a fully closed and a fully open position; and
   wherein each pinch element respectively defines a pinch region that confronts an outer wall of the tube to define a profile that surrounds substantially the outer perimeter of the tube, the pinch region varying about a circumference of each of the first pinch element and the second pinch element between (a) the fully open position in which the profile conforms to a shape of an outer perimeter of the tube in an unpinched state, through (b) a continuous ramping surface in which the profile at various points around the circumference defines, for pinching the tube, progressively from a shortened flattened segment at large depth with respect to the axis of extension and large-radius filleted ends to a lengthened flattened segment of small depth with respect to the axis of extension and small-radius filleted ends to (c) the fully closed, position in which the profile defines, a maximum length flattened segment at minimum depth with respect to the axis of extension and minimum-radius filleted ends, whereby the tube is substantially engaged along substantially the outer perimeter by the pinch region at all circumferential positions of the pinch elements.

2. The pinch valve as set forth in claim 1 the first pinch element is constructed and arranged to counter-rotate with respect to the second pinch element.

3. The pinch valve as set forth in claim 2 wherein the first pinch element includes a first and the second pinch element includes a second gear and wherein the first gear engages the second gear to cause the first pinch element to rotate in response to rotation of the second pinch element.

4. The pinch valve as set forth in claim 2 wherein the tube is fixedly attached into the housing and the housing includes end connectors for interconnecting with a fluid system.

5. The pinch valve as set forth in claim 4 wherein the housing includes a first flared end and a second flared end, the tube includes a first shaped end that conforms to the first flared end and a second shaped end that conforms to the second flared end, a first sealed end cap with a first end connector engaging the first flared end and a second sealed end cap with a second end connector engaging the second flared end.

6. The pinch valve as set forth in claim 1 wherein the first pinch element and the second pinch element each include cylindrical top and bottom sections that respectively bound the pinch region.

7. The pinch valve as set forth in claim 6 wherein the housing includes wells for receiving the cylindrical top and bottom sections to restrain the pinch elements against lateral movement during rotation.

8. A pinch valve comprising:
   a housing that encloses a flexible tube;
   a first pinch element and a second pinch element, each being oriented on a respective axis of rotation transverse to an axis of extension of the tube, each of the first pinch element and the second pinch element being constructed and arranged to counter-rotate with respect to each other between a fully closed and a fully open position; and
   wherein each of the first pinch element and the second pinch element define one half of a profile that ranges along a circumference of rotation from a fully open shape in which the tube is unpinched to a fully closed shape, in which the tube is fully pinched together and wherein the profile, at all times through rotation from the fully open shape to the fully closed shape engages substantially an entire outer perimeter of the tube to force the tube to remain in the desired shape.

9. The pinch valve as set forth in claim 8 wherein the pinch region varies about the circumference of each of the first pinch element and the second pinch element between (a) the fully open position in which the profile conforms to a shape of an outer perimeter of the tube in an unpinched state, through (b) a continuous ramping surface in which the profile at various points around the circumference defines, for pinching the tube, progressively from a shortened flattened segment at large depth with respect to the axis of extension and large-radius filleted ends to a lengthened flattened segment of small depth with respect to the axis of extension and small-radius filleted ends to (c) the fully closed, position in which the profile defines, a maximum length flattened segment at minimum depth with respect to the axis of extension and minimum-radius filleted ends.

* * * * *